S. A. EKEHORN.
MILKING MACHINE.
APPLICATION FILED DEC. 13, 1909.
994,138.
Patented June 6, 1911.
2 SHEETS—SHEET 1.
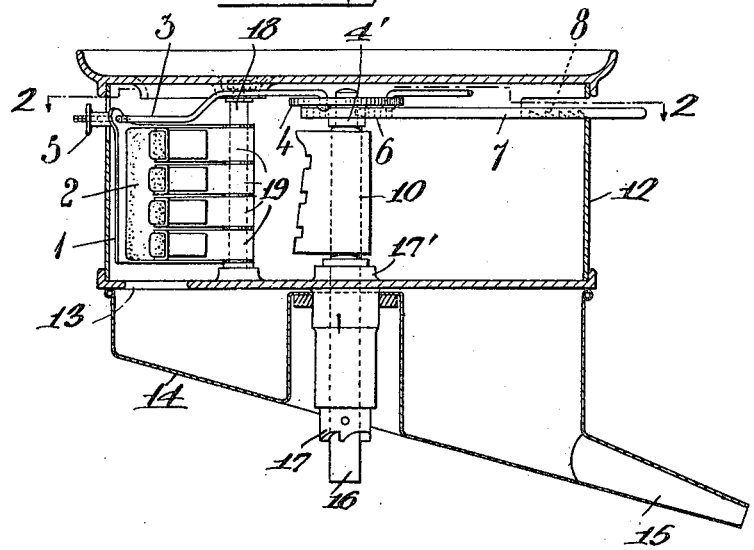
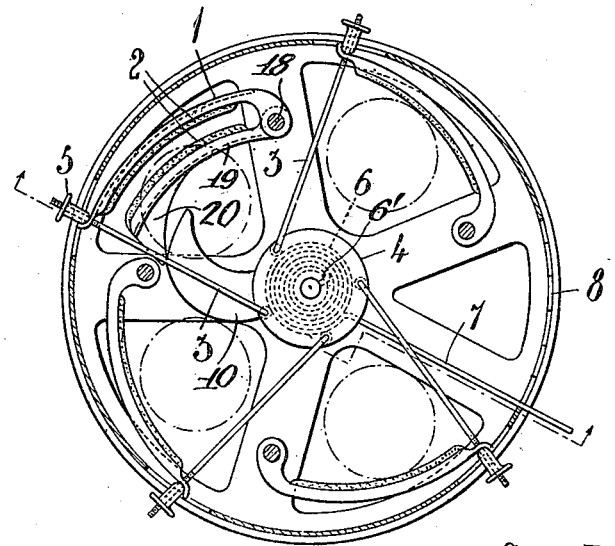
Witnesses
J. S. Freeman.
Inventor
Sven A. Ekehorn,
by B. Singer
Attorney.

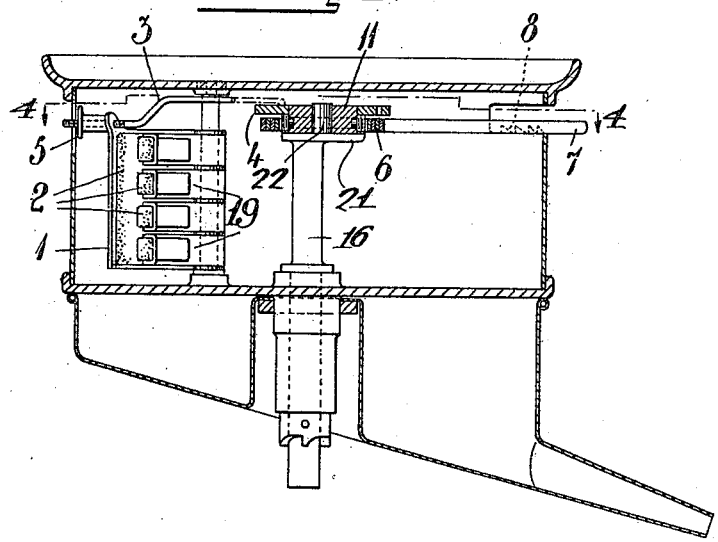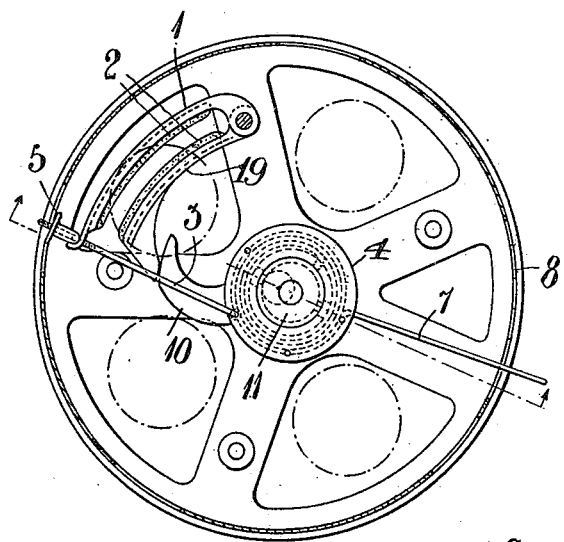

UNITED STATES PATENT OFFICE.

SVEN AUGUST EKEHORN, OF STOCKHOLM, SWEDEN.

MILKING-MACHINE.

994,138. Specification of Letters Patent. Patented June 6, 1911.

Application filed December 13, 1909. Serial No. 532,845.

*To all whom it may concern:*

Be it known that I, SVEN AUGUST EKEHORN, a subject of the King of Sweden, and residing at Stockholm, Sweden, have invented certain new and useful Improvements in Milking-Machines, of which the following is a specification.

This invention relates to improvements in milking machines of that character in which the teat or dug of the animal is grasped and successively compressed from the root or base toward the end for the purpose of withdrawing the milk.

One of the objects of this invention is to provide a yielding and preferable adjustable connection for one part of the teat grasping device and positive acting means for another portion of said device. So that if the positively acting means exerts too great a pressure, relief may be afforded by such yielding connection.

The device of my invention will be more fully described in connection with the accompanying drawings and will be more particularly pointed out and ascertained in and by the appended claims.

In the drawings: Figure 1 is a vertical sectional view, with parts in elevation, of a machine embodying one form of my invention. Fig. 2 is a horizontal sectional view on line 2—2 of Fig. 1. Fig. 3 is a view similar to Fig. 1 of a modified form of my invention. Fig. 4 is a sectional view on line 4—4 of Fig. 3.

Like numerals of reference designate similar parts throughout the different figures of the drawings.

For clearness of illustration I have only shown one complete teat grasping device in each view, but it will be understood that any desired number of these devices may be provided.

First referring to the form shown in Figs. 1 and 2, 12 designates a casing or housing having upper and lower walls and in the lower walls of which discharge openings 13 are formed. A suitable discharge outlet casing 14, is provided, having a discharge spout 15. An operating shaft 16 is provided with a bearing 17' and projects into the casing 12 and may be driven from any suitable source of power. In the form shown one member of a clutch 17 is indicated, but inasmuch as this does not constitute a part of my invention this construction will not be further described. A spindle 18 is mounted in the upper and lower walls of the casing 12 and on this spindle is mounted one of a pair of dug engaging elements 1. As shown, a plurality of companion dug engaging elements 19 is provided and which are arranged to co-act with the elements 1 in compressing the dug, said elements are suitably cushioned and covered, as indicated at 2 to provide a soft yielding surface for engagement with the dug. The elements 19 are provided with cam engaging portions 20 disposed and arranged to be actuated by a plurality of cams, or a single cam 10 mounted on the shaft 16 and provided with projecting cam portions. As is common in this kind of machines the cam portions of the cam 10 may be arranged to successively actuate the elements 19 by first compressing the uppermost element thereof and thereafter successively compressing or actuating the next lower element. On the upper end of the shaft 16 a disk 4 is loosely mounted and is provided with a hub 4'. A connection 3 is provided between the disk 4 and the element 1 and such connection is rendered adjustable by a nut 5. A spring 6 is spirally wound about the hub 4' and is connected therewith at 6', at one end of the spring. The other end of the spring is indicated at 7 and projects radially through an opening in the casing 12 so as to render the end 7 accessible to the operator. On the lower margin of said opening a plurality of notches 8 is formed and the end 7 may be advanced along and seated in one of said notches for the purpose of increasing or decreasing the tension of the spring. It will readily be seen that the cams impart a uniform compressing movement to the elements 19 about the spindle 18 and toward the element 1, and that if this compression is too severe upon the dug the element 1 may yield to relieve the pressure. It will be seen that the amount of compression may be determined not only by adjustment of the nut 5 but also by the adjustment of the spring end 7.

Next referring to the form of my invention shown in Figs. 3 and 4, 16 designates the operating shaft on the upper end of which a disk 21 is provided. This disk 21 carries a stud or pin 22 which is eccentrically disposed with respect to the axis of the shaft 16. On this pin 22 is loosely mounted the hub 11 of a disk 4. A spring 6 is spirally disposed about this hub and is secured thereto at one end in a manner similar to the construction shown in Fig. 1. The end 7 of the spring 6 is adjustable in notches 8 in a manner similar to the first described construction. A connection 3 is provided between the disk 4 and element 1, and this connection is likewise rendered adjustable by a nut 5. In this construction the cams 10 and the eccentrically disposed stud 22 are so timed that the element 1 will be drawn inwardly at the same time that the elements 19 are forced outwardly. This action results from the bodily circular movement imparted to disk 4 by the eccentric rotation of the stud 22.

I claim:—

1. A milking machine comprising in combination, movably mounted dug engaging elements, power actuated means connected with one of said elements to operate the same, a power actuated means moving in timed relation with said first named means to actuate the remaining element coöperative with the first named element.

2. A milking machine comprising in combination, movably mounted dug engaging elements, rotary means moving one of said elements to compress the dug, and a member moving in timed relation with said means and yieldingly connected with the companion element to compress the dug therebetween.

3. A milking machine comprising in combination, pivotally mounted dug engaging elements, a shaft provided with a cam for engaging one of said elements to compress the dug, a disk eccentrically mounted on said shaft and provided with a connection with the other elements, and a spring for rendering the engagement of said elements with said dug yielding.

4. A milking machine comprising in combination, movably mounted dug engaging elements, a shaft, a cam on said shaft for moving one of said elements to compress the dug, a disk eccentrically mounted on said shaft, means connecting a portion of the periphery of said disk with the remaining dug engaging element, a spring for altering the position to said disk on said eccentric, and elements whereto said spring may be adjustably anchored.

5. A milking machine comprising in combination, movably mounted dug engaging elements, power actuated means yieldingly connected with one of said elements to actuate the same and power actuated means moving in timed relation with said first named means for rigidly engaging the remaining element and actuate the same in coöperative relation with said first named element.

6. A milking machine comprising in combination, movably mounted dug engaging elements, power actuated means yieldingly connected with one of said elements to actuate the same, a device for varying the tension of said yielding connection, a power actuated means moving in timed relation with said first named means to actuate the remaining element in coöperative relation with said first named element.

7. A milking machine comprising in combination, movably mounted dug engaging elements, power actuated eccentric means for actuating one of said elements, a power actuated means moving in timed relation with the said first named means for actuating the remaining element in coöperative relation with said first named element.

In testimony whereof I have signed my name to this specifications in the presence of two subscribing witnesses.

SVEN AUGUST EKEHORN.

Witnesses:
J. R. MARKHAM,
ASTRID BERG.

---

Copies of this patent may be obtained for five cents each, by addressing the "Commissioner of Patents, Washington, D. C."